US011736678B2

(12) United States Patent
Allio et al.

(10) Patent No.: US 11,736,678 B2
(45) Date of Patent: Aug. 22, 2023

(54) AUTOSTEREOSCOPIC P-POINT-OF-VIEW DISPLAY SCREEN FOR DISPLAYING AN AUTOSTEREOSCOPIC I-POINT-OF-VIEW IMAGE AND DISPLAY DEVICE INCLUDING SUCH A SCREEN

(71) Applicant: ALIOSCOPY, Paris (FR)

(72) Inventors: Pierre Allio, Le Raincy (FR); Flavien Maingreaud, Commeny (FR); Gilles Marcellier, Paris (FR)

(73) Assignee: ALIOSCOPY, Paris (FR)

( * ) Notice: Subject to any disclaimer, the term of this patent is extended or adjusted under 35 U.S.C. 154(b) by 31 days.

(21) Appl. No.: 17/676,802

(22) Filed: Feb. 21, 2022

(65) Prior Publication Data

US 2022/0272318 A1  Aug. 25, 2022

Related U.S. Application Data

(60) Provisional application No. 63/155,306, filed on Mar. 2, 2021.

(51) Int. Cl.
*H04N 13/305* (2018.01)
*H04N 13/31* (2018.01)
(Continued)

(52) U.S. Cl.
CPC ........... *H04N 13/305* (2018.05); *H04N 13/31* (2018.05); *H04N 13/324* (2018.05); *H04N 13/351* (2018.05); *H04N 13/366* (2018.05)

(58) Field of Classification Search
CPC .... H04N 13/305; H04N 13/31; H04N 13/324; H04N 13/351; H04N 13/366; H04N 13/317
(Continued)

(56) References Cited

FOREIGN PATENT DOCUMENTS

| DE | 102004059729 B3 | 4/2006 |
| WO | 2008003373 A1 | 1/2008 |
| WO | 2008011888 A1 | 1/2008 |

OTHER PUBLICATIONS

Jing Liua, Tom Malzbenderb, Siyang Qina, Bipeng Zhanga, Che-An Wua and James Davisa, Dynamic Mapping for Multiview Autostereoscopic Displays, in Stereoscopic Displays and Applications XXVI, edited by Nicolas S. Holliman, Andrew J. Woods, Gregg E. Favalora, Takashi Kawai, Proc. of SPIE-IS&T Electronic Imaging, vol. 9391, 939111 (2015).

*Primary Examiner* — Tung T Vo
(74) *Attorney, Agent, or Firm* — CRGO Global; Steven M. Greenberg

(57) ABSTRACT

A display screen with P screen points-of-view, P being an integer greater than or equal to 6, displays an autostereoscopic image at I image points-of-view, I being an integer greater than or equal to 2, less than or equal to P/3. The screen includes a matrix (10) of pixels arranged by rows and by columns; an optical array configured so that the P points-of-view of the screen can be perceived successively in lobes, each covering I times the average inter-pupillary distance of an observer (8), so that the screen points-of-view of each pair of points-of-view visible to the observer are separated by at least T buffer points-of-view, T being greater than or equal to 2, so that it is possible to display successively for each lobe, each of the I image points-of-view, each repeated P/I times, and that each point-of-view visible to the observer can be surrounded by at least 2 buffer points-of-view each displaying this same image point-of-view.

15 Claims, 13 Drawing Sheets

(51) Int. Cl.
*H04N 13/366* (2018.01)
*H04N 13/351* (2018.01)
*H04N 13/324* (2018.01)

(58) Field of Classification Search
USPC .......................................................... 348/59
See application file for complete search history.

[Fig. 1]
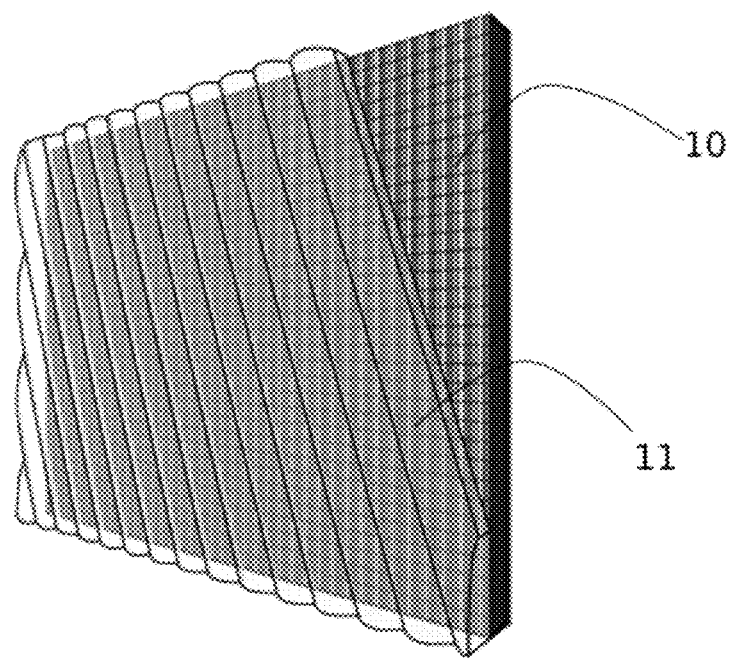

[Fig. 2]
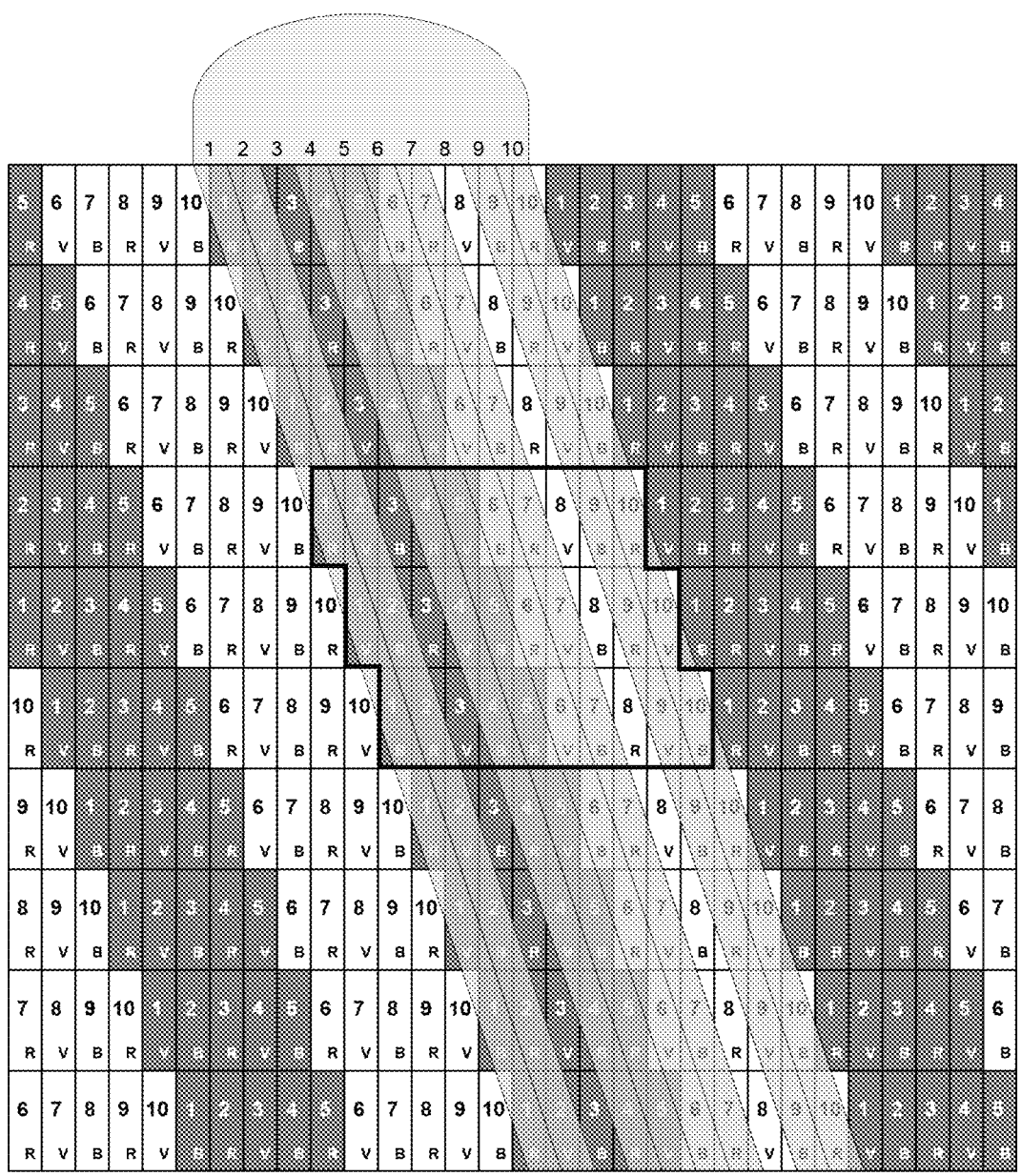
[Fig. 3]
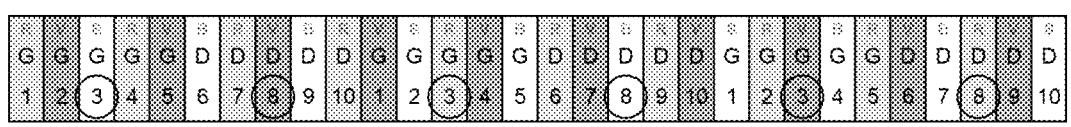

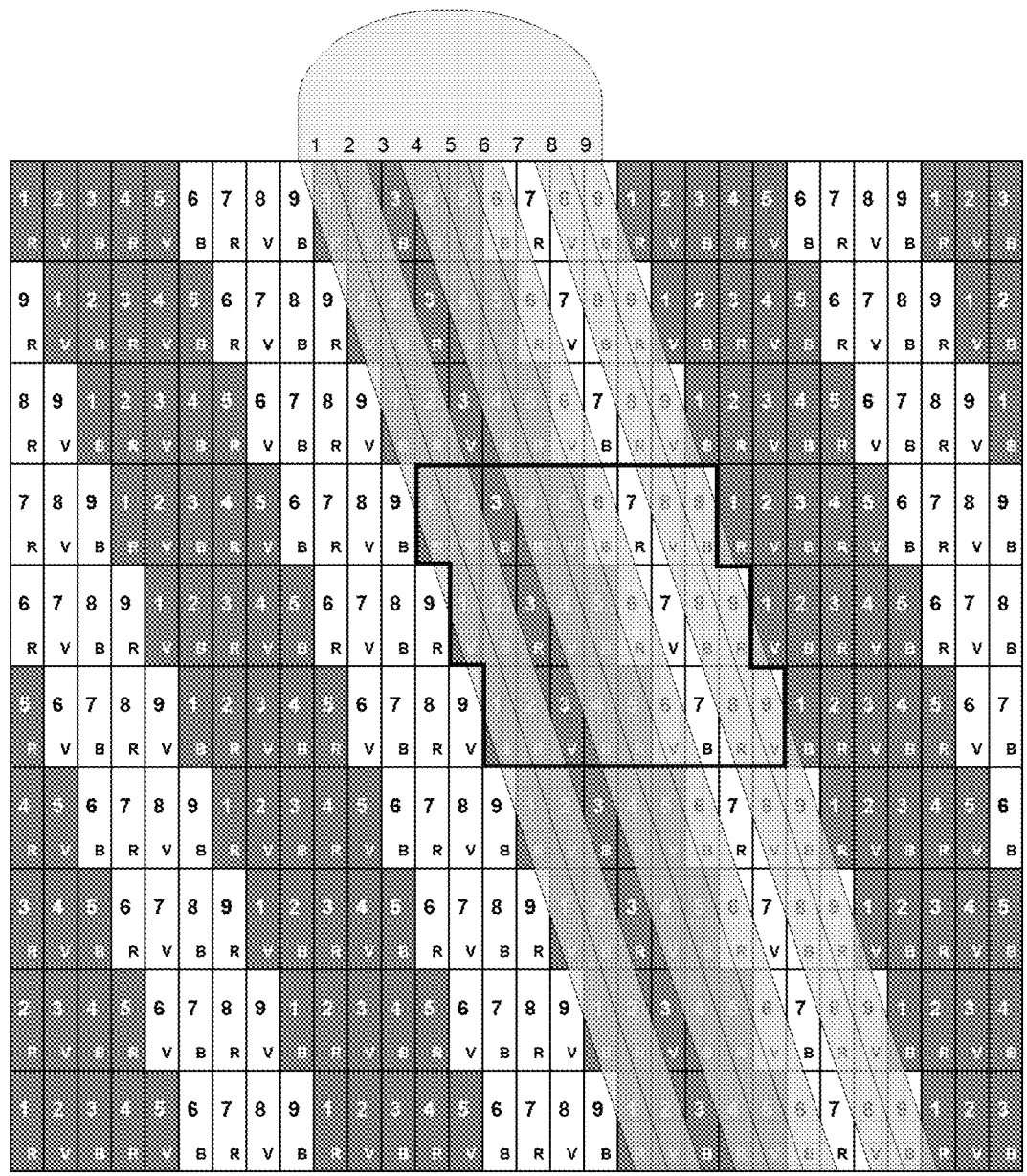
[Fig. 4]

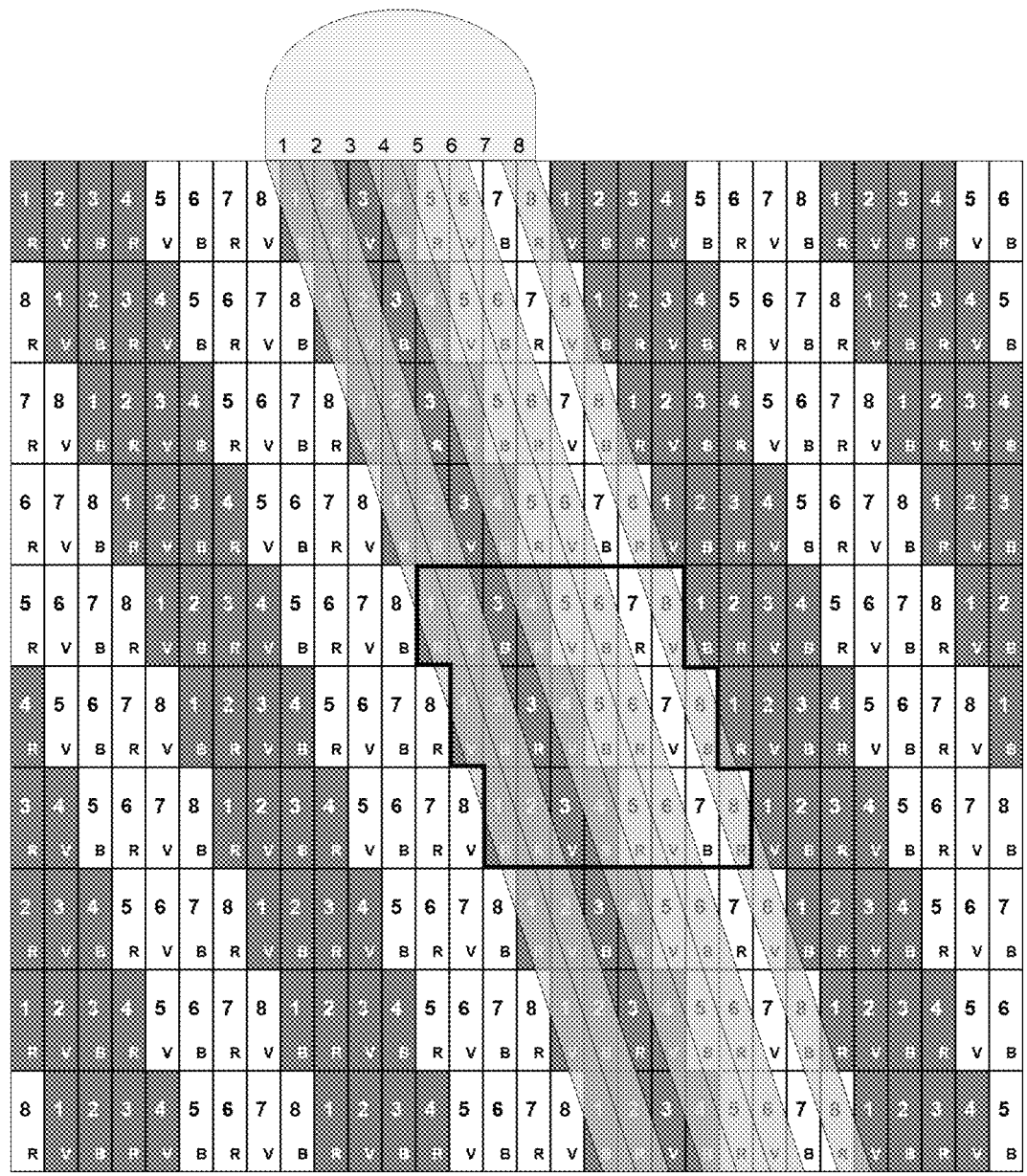
[Fig. 5]

[Fig. 6]
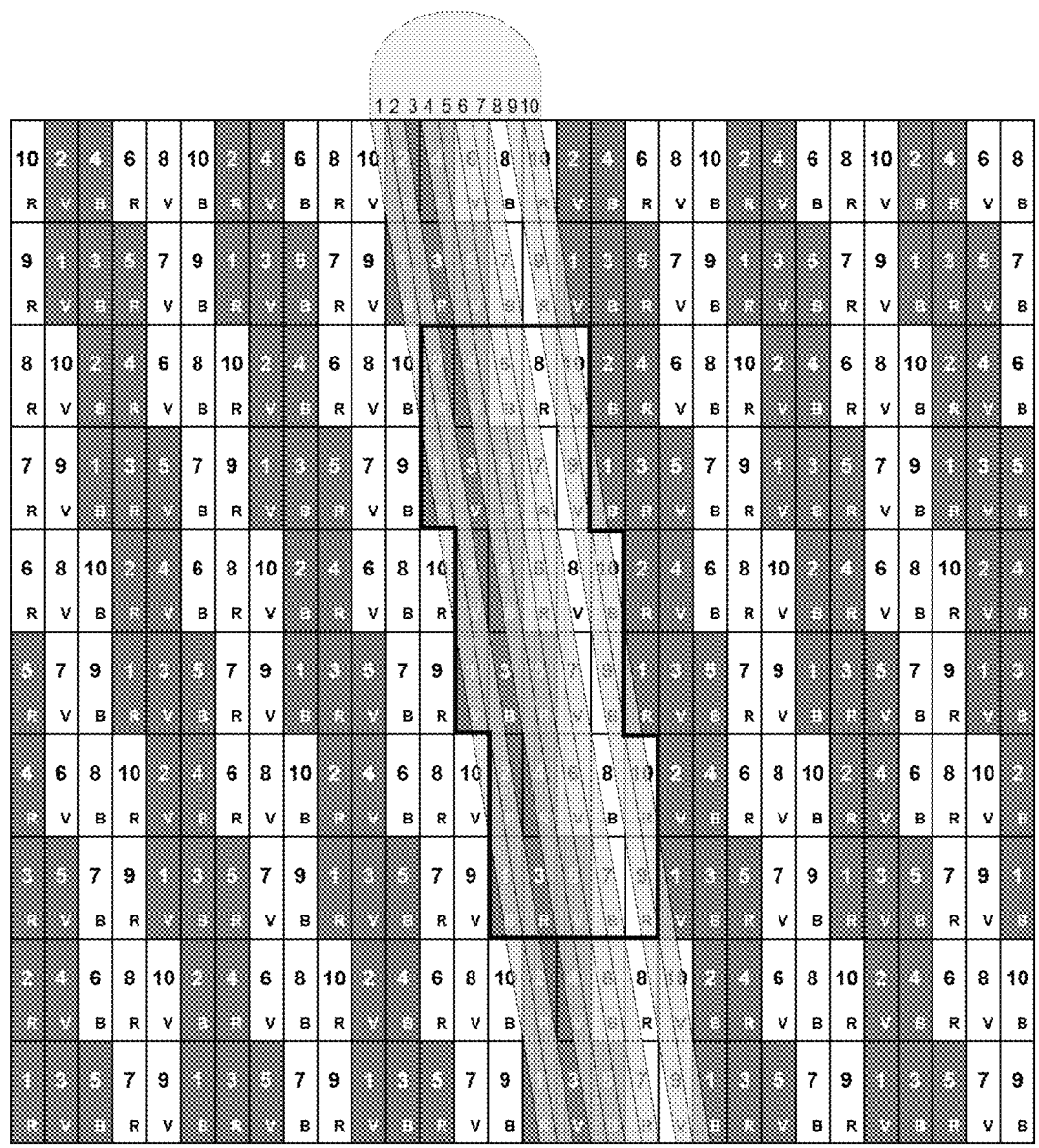

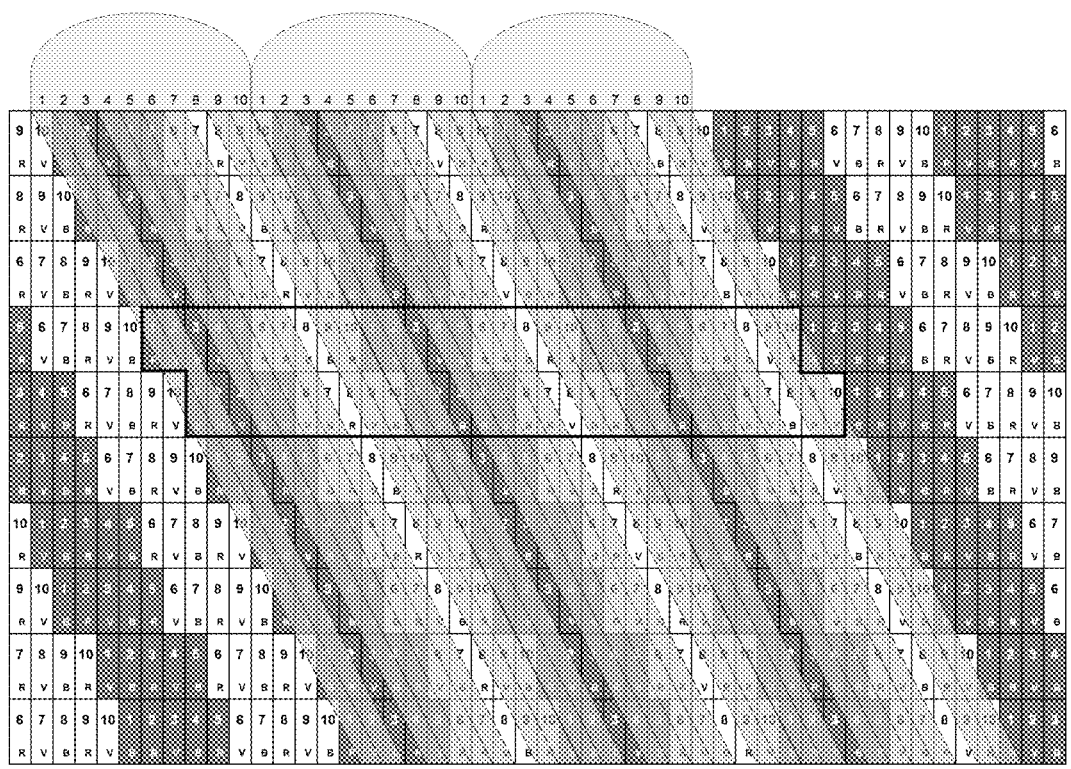
[Fig. 7]

[Fig. 8]
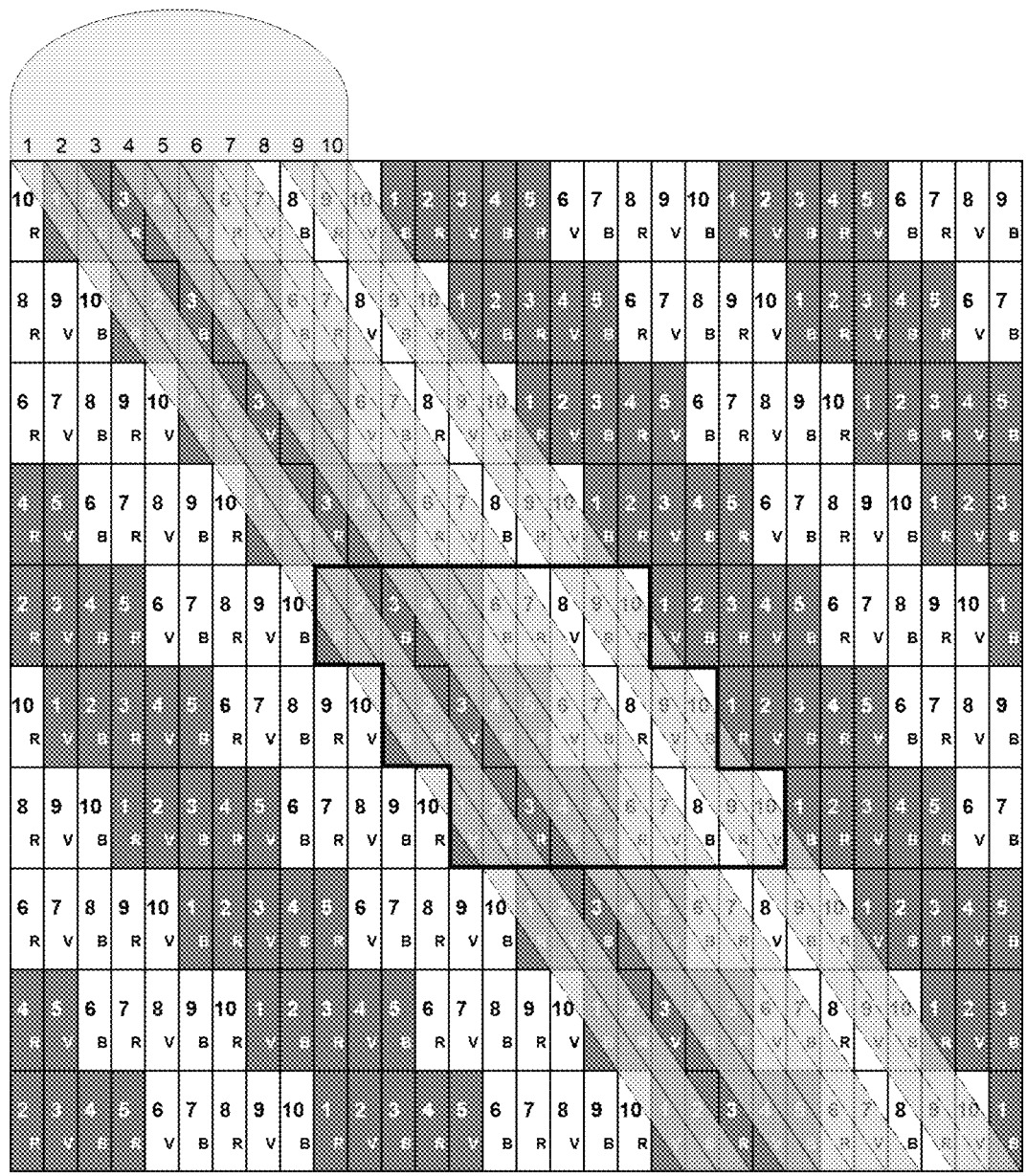

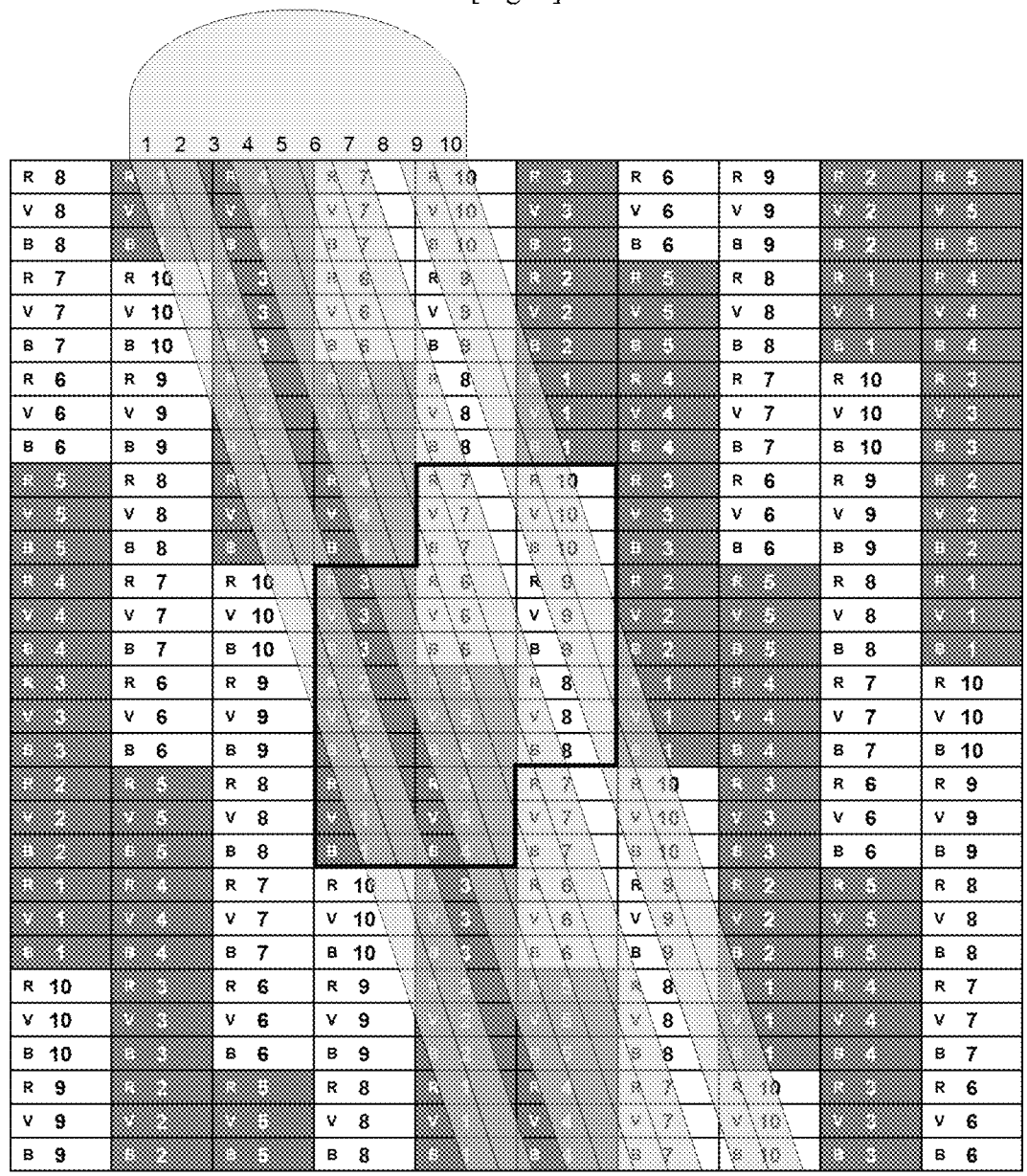
[Fig. 9]

[Fig. 10]
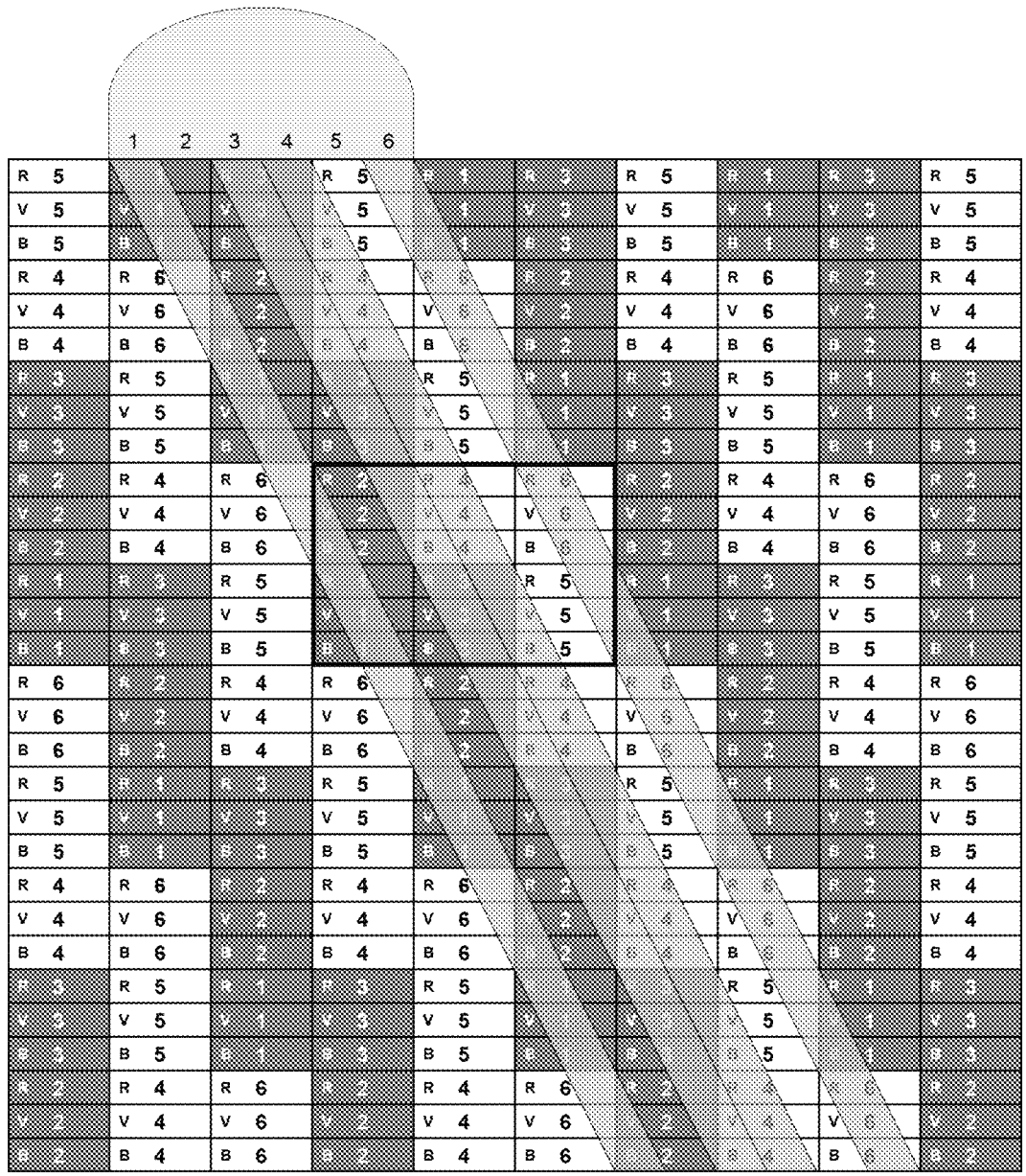

[Fig. 11]
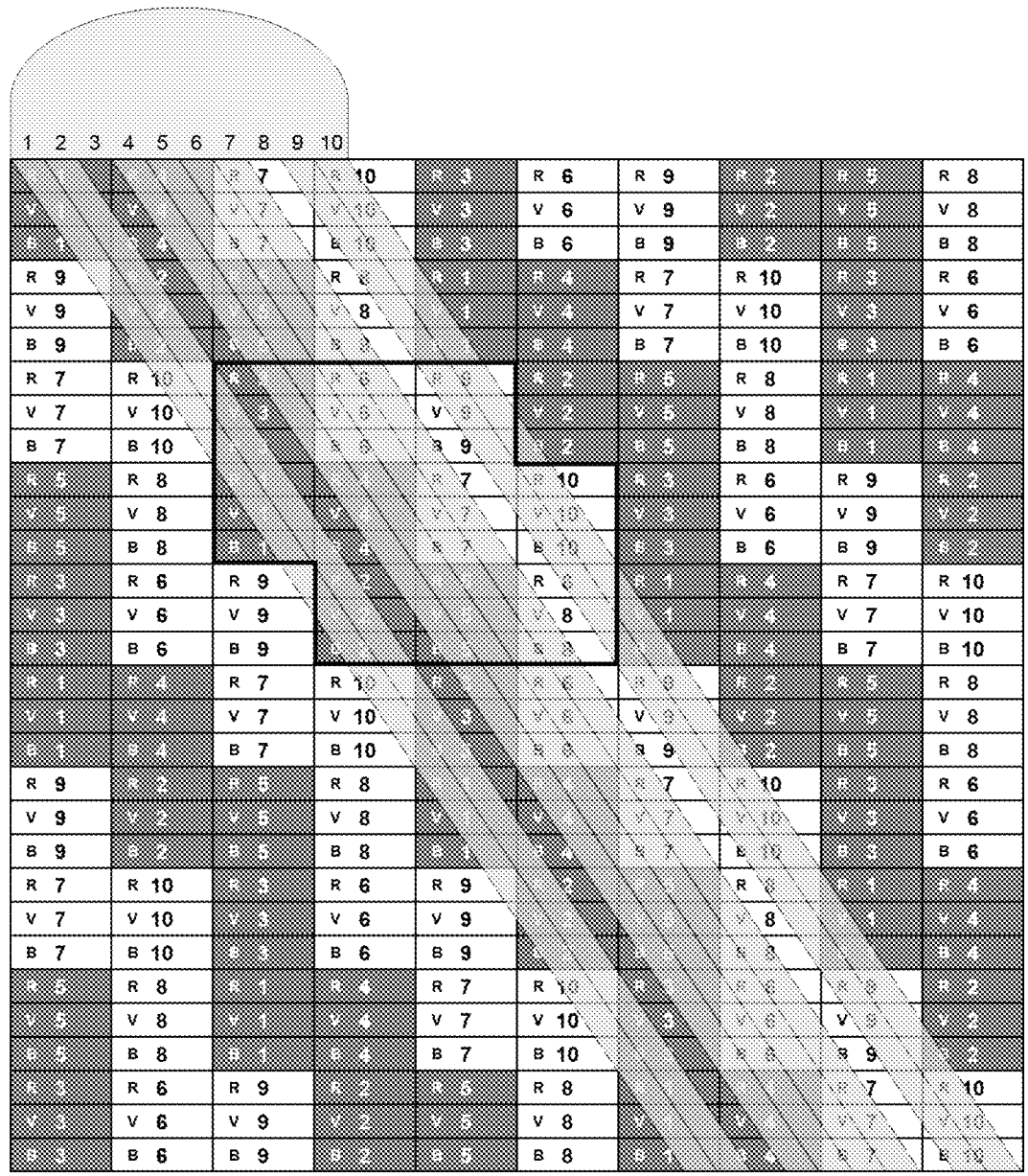

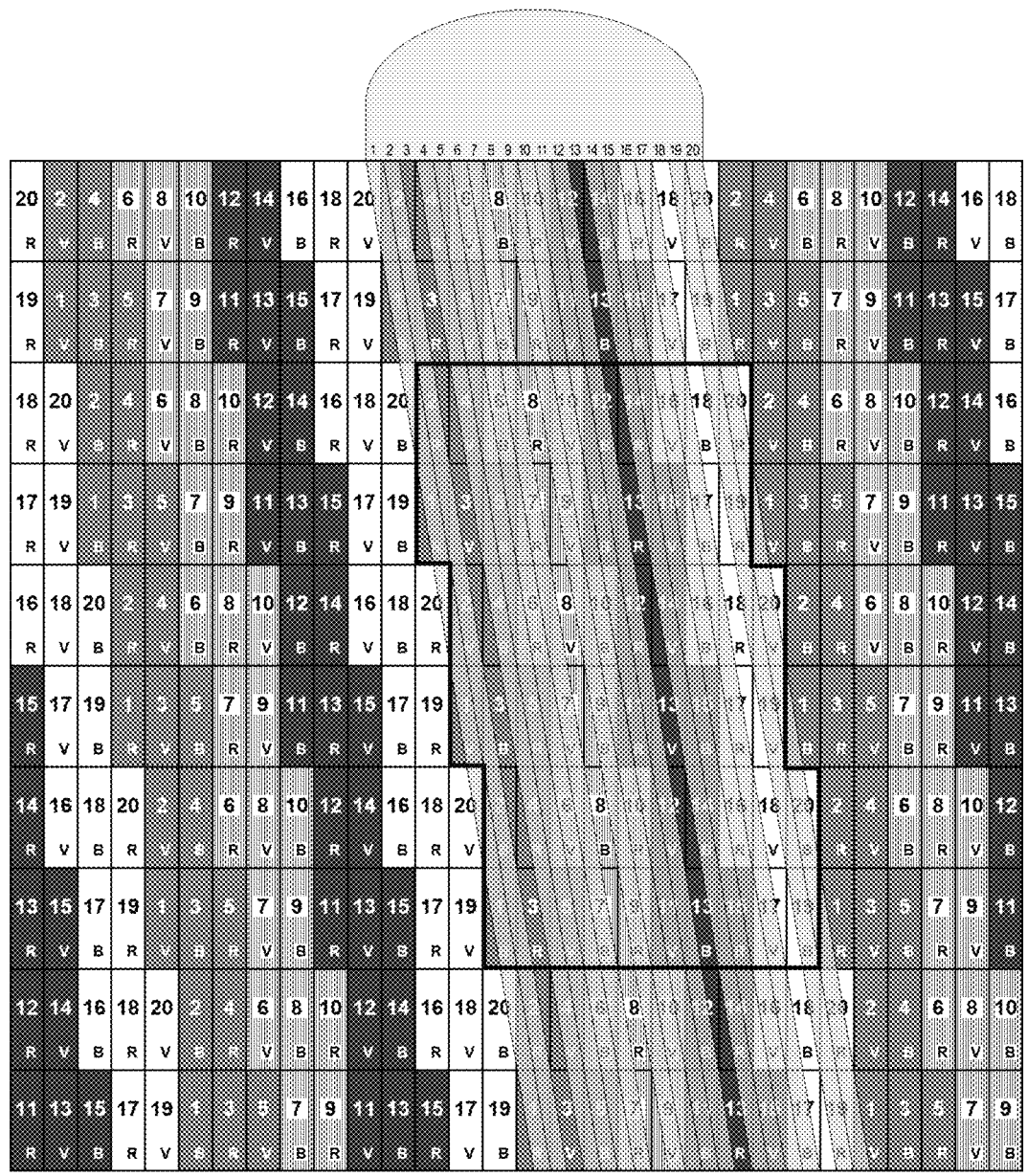
[Fig. 12]

[Fig. 13]
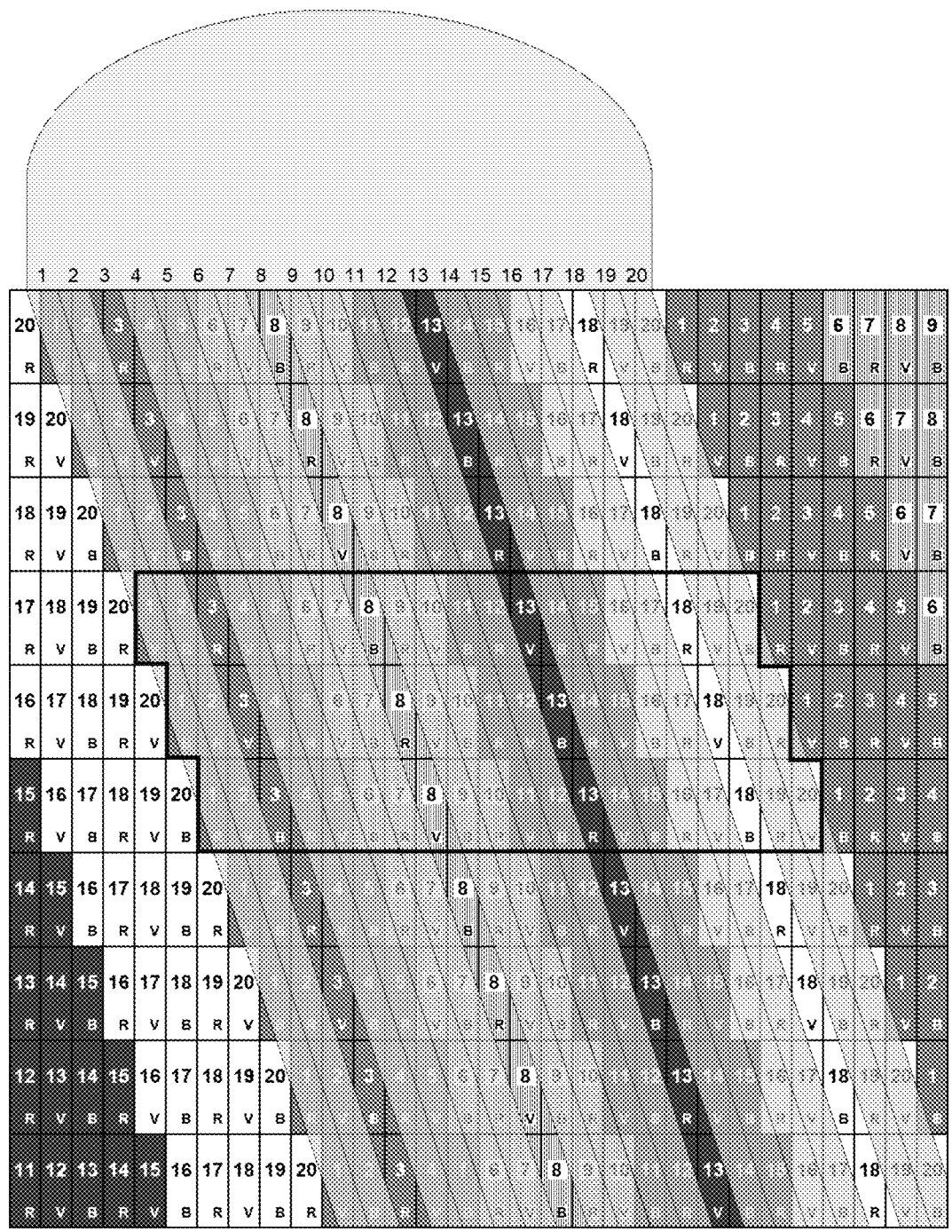

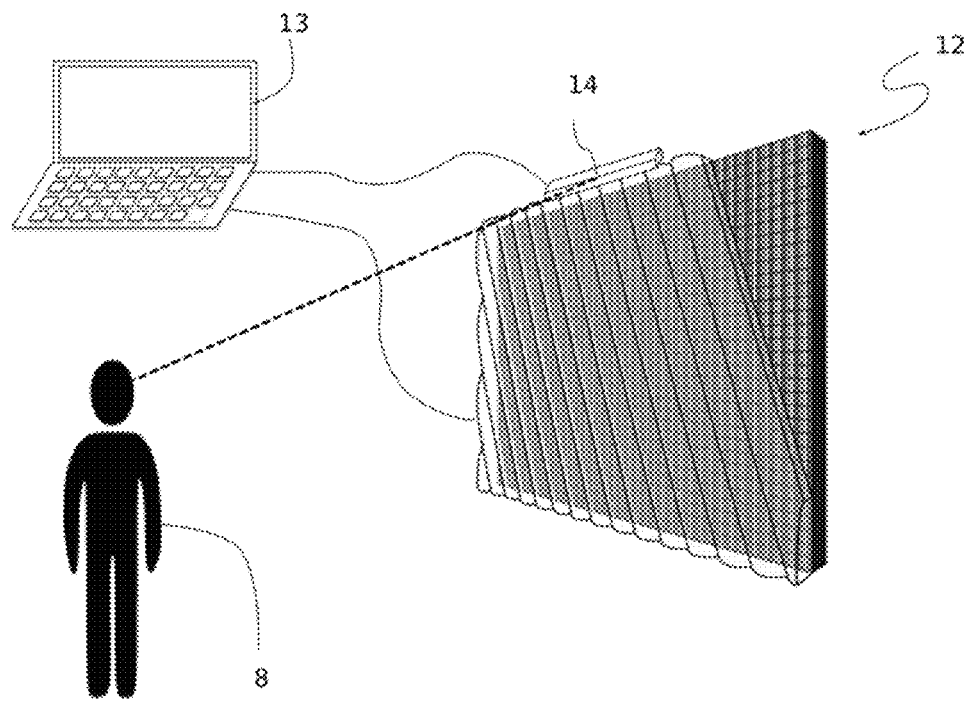
[Fig. 14]

AUTOSTEREOSCOPIC P-POINT-OF-VIEW DISPLAY SCREEN FOR DISPLAYING AN AUTOSTEREOSCOPIC I-POINT-OF-VIEW IMAGE AND DISPLAY DEVICE INCLUDING SUCH A SCREEN

CROSS REFERENCE TO RELATED APPLICATIONS

This application claims priority under 35 U.S.C. § 119(e) to U.S. Provisional Patent Patent Application No. 63/155,306 filed on Mar. 2, 2021, the entire teachings of which are incorporated herein by reference, and also under 35 U.S.C. § 119(a) to French Patent Application No. FR2101710 filed on Feb. 22, 2021, the entire teachings of which are incorporated herein by reference.

BACKGROUND OF THE INVENTION

Field of the Invention

The invention relates to an autostereoscopic display screen of an autostereoscopic image and to a display device including such a display screen. The invention also relates to a method for displaying an autostereoscopic image on such a display screen.

Description of the Related Art

Autostereoscopy is a technique that enables images to be displayed in relief without requiring the observer to wear special eyewear. This technique itself constitutes prior knowledge, with reference in particular to patent documents WO2006/024764, WO2014/041504, WO2013/140363 and WO2014/016768 registered in the applicant's name.

In general, an autostereoscopic image consists of a plurality of nested elementary images, each corresponding to views of the same object or of the same scene according to different points-of-view. A selector device, typically constituting an array of cylindrical lenticular lenses or a parallax barrier, is arranged in front of the display screen so as to allow the projection of a pair of elementary images corresponding to two different points of view of a single scene towards each of the two eyes of the observer, which creates an impression of relief in the brain of the observer.

A screen displaying a P-point-of-view autostereoscopic screen image typically includes a pixel matrix arranged in rows and columns, each pixel being composed of multiple sub-pixels of different colors. The screen is further overlaid with a array of identical cylindrical lenticular lenses each having a focal length configured such that it returns the light rays coming from the screen an infinite number of times. The spacing of the cylindrical lenticular array is precisely calculated so that the observer sees, at a predetermined distance from the screen (called the flat tint distance), the images shift in succession at regular intervals, due to the magnifying effect of the lenticular array.

This magnifying effect results from the fact that a lens placed at the right distance (its focal length) magnifies the sub-pixel which is in alignment with its optical center and the pupil of the eye of the observer. If the lens is magnified P times, the sub-pixel seen through the lens is perceived wider than it is and obscures from the eye that receives the light through this lens the P-1 other sub-pixels that are not in the alignment described above.

The array of cylindrical lenticules therefore forms a viewpoint selector device configured to allow the projection of a pair of differentiated points-of-view in the observation space of the screen, corresponding to two different points-of-view of the scene, respectively towards the two eyes of the observer.

When certain elements of the two images observed respectively by the left eye and the right eye of an observer show no disparity (defined as the difference, measured in pixels or sub-pixels, observable and/or measured between the left and right), these elements are superimposed perfectly and are then perceived on the plane of the screen. On the other hand, when there is a disparity between the elements observed, the latter burst from the screen or on the contrary are perceived in depth. By convention, depth corresponds to a positive disparity while bursting corresponds to a negative disparity. The shift in absolute value between the two images is the same in both cases but when the disparity is negative, the bursting elements of the left image are to the right of those of the right image and vice versa. It is this shift that produces a burst effect (the two eyes converge in front of the screen). On the other hand, when the disparity is positive, the elements in depth of the left image are to the left of those of the right image and vice versa (the two eyes converge behind the screen).

An object of the size of a point is perceived all the more far from the plane of the screen as the offset on the horizontal plane of this point between the left image and the right image is important.

Current autostereoscopic screens are confronted with limits of depth and achievable burst without loss of quality. These screens make it possible to register the projected content in a viewing cube whose depth is close to the diagonal of the screen. The screens are generally used in such a way that one third of the visualization cube springs from the screen and that the remaining two thirds are perceived in depth, behind the plane of the screen.

For example, on a 24" screen this means that the standard viewing cube can have a full range of around 60 cm, with a comfortable burst 20 cm in front of the screen and backgrounds 40 cm behind the screen.

These depth and burst limits are explained by physiological constraints of the observer, by technological constraints and by image processing constraints.

The physiological constraints result from the fact that each eye of the observer sees a different image in order to be able to form a stereoscopic couple which he merges by converging his gaze where the disparity seems to place the objects in space.

The disparity between the left and right images induces three different modes of convergence:

when the observer perceives an object in depth behind the screen, the left eye looks more to the left and the right eye more to the right. Thus, the two optical axes intersect behind the screen, where the observed virtual object is located, when the observer perceives an object on the same plane of the screen, both eyes look at the same place on the screen, when the observer perceives an object bursting in front of the screen, the left eye looks more to the right and the right eye more to the left. Thus, the two optical axes intersect in front of the screen, where the observed virtual object is located.

When objects are perceived in depth or in bursts, the gaze converges at distances different from that of the plane of the screen. This necessarily leads to a dissociation between the different convergences described above and accommodation, which must correspond to the effort of each eye to see the sharp images at the distance from the screen.

The further an object is from the plane of the screen, the greater the effort of dissociation between the plane of convergence and the physical plane of the screen where the eyes accommodate. However, the observers are all unequal in the face of the ocular gymnastics necessary to operate this dissociation. Only experience and training can effortlessly dissociate vergence and accommodation. If you don't get used to it, objects can appear blurred, even split, when you converge away from the surface of the screen and binocular fusion becomes difficult. As in the physical world, the eyes seek sharpness at the distance at which they converge and where the virtual objects are, even though the two images never leave the physical surface of the screen.

The technological constraints result from the fact that it is technically complicated to display several images simultaneously on an autostereoscopic screen and to separate them perfectly for each eye.

Indeed and as indicated above, an autostereoscopic screen consists of a screen and an optical system, placed on its surface. By magnifying effect, this optical system makes it possible to subdivide the field of observation of the screen into contiguous zones, each specifically reserved for a different image. To see in relief, these images must at least form a stereoscopic couple. It is generally insufficient to display only a single pair from two images and the majority of the screens proposed by the applicant display a series of eight images simultaneously, stereoscopic two by two. The space formed by the eight contiguous zones occupied by each of these eight images is designated by the term lobe, which the optical system makes it possible to repeat periodically. The succession of points-of-view is always in the same order. This repeating display allows the lobes to repeat without the lenticular array becoming too out of focus, over an angle of approximately 100°.

The perfect compartmentalization of the information displayed in each contiguous zone of a lobe remains a challenge. Indeed, the light from the backlighting of the screen passes through many materials before reaching the eye of the observer. Some of the light that passes through each of the surfaces of these different materials is slightly deviated from its ideal trajectory. In addition, to limit the diffusion of the light emitted, the surfaces of the screen and the lenticular array must be perfectly polished-glass and not present any internal inhomogeneity such as frosting in the material itself, frequent to obtain anti-reflective surfaces. Each micro-imperfection is likely to deviate the light and disturb the refraction effect of the microlenses intended to separate the points-of-view. The shape of the pixels and the fact that the optical axis of the lenses can simultaneously intersect sub-pixels assigned to different points-of-view can prevent this partitioning.

Image processing constraints result from the fact that the computer processing options are dependent on a certain number of parameters including the number of points-of-view, their repetition, the width of the lobes, the observation distance and the number of simultaneous observers. The electronics of the screen or of the computer may apply modifications that can be detected in the content of the images to be displayed, which has the effect of modifying the strictly necessary localization. For example, by modifying the intensity of an entire pixel, its three sub-pixels are affected at the same time, i.e. three points-of-view simultaneously (in the case where a single sub-pixel is used per point-of-view picture).

The applicant has already proposed a system equipped with a device for tracking the head of the observer to make it possible to display in real time the points-of-view to be sent to each eye of the observer. Tracking speed and accuracy are even more critical the farther objects are from the plane of the screen. A minute movement of the head then results in a significant apparent displacement of the objects, in particular, when the objects are very deep, which is one of the objectives of the invention.

The inventors have therefore sought a solution which makes it possible to overcome at least some of the aforementioned constraints.

BRIEF SUMMARY OF THE INVENTION

The invention aims to provide an autostereoscopic display screen which makes it possible to overcome the limits of burst and depth attainable by known autostereoscopic screens.

The invention aims in particular to provide a screen with almost perfect resolving power, which gives the observer the possibility of perceiving the volume in burst up to half the distance of the flat tint and that in depth up to several meters. behind the plane of the screen, without there being any real limit, while maintaining optimal sharpness of the display for each eye, despite the significant disparity that it is necessary to register in the content to achieve this.

The invention aims in particular to provide a display screen which makes it possible to increase the relief performance of known screens while maintaining, or even improving, the quality of the observed image.

The invention aims in particular to provide a screen for displaying an autostereoscopic image which has greater resolving power than known screens.

The invention also aims to provide a display screen which makes it possible to limit the interference between the points-of-view visible by each eye of the observer.

The invention also aims to provide an autostereoscopic display device which includes a display screen according to the invention.

The invention finally aims to provide a method for displaying an autostereoscopic image on an autostereoscopic display screen according to the invention.

To do this, the invention relates to an autostereoscopic display screen with P points-of-view, called screen points-of-view, P being an integer greater than or equal to 6, intended to display an autostereoscopic image at I points-of-view, called image points-of-view, I being an integer greater than or equal to 2, less than or equal to P/3, preferably equal to 2, the screen including:
- a matrix of pixels which are arranged in rows and columns, each pixel being composed of a plurality of sub-pixels of different colors, each intended to display a sub-pixel of one of the image points-of-view,
- an array of cylindrical lenticules or a parallax barrier, called an optical array, configured to allow the projection of pairs of predetermined points-of-view of the screen towards the eyes of an observer located at a nominal distance from the screen, so-called flat tint distance.

The screen according to the invention is characterized in that the optical array is configured so that the P points-of-view of the screen can be perceived successively in a direction, called horizontal direction, by the observer at the tint distance flat, in spaces in front of the screen, called lobes, each covering I times the average inter-pupillary distance of an observer, and so that the screen points-of-view of each pair of points-of-view visible by the observer at the flat tint distance are separated by at least T screen points-of-view, called buffer points-of-view, T being greater than or equal to 2, so that it is possible to display successively for each lobe, each of the I image points-of-view, each repeated P/I times, and that each point-of-view visible to the observer at the flat tint distance can be framed by at least 2 points-of-view buffers each displaying this same image point-of-view.

A display screen according to the invention therefore has the particularity of being equipped with an optical array, such as a array of cylindrical lenticules (also designated by the terms optical component) configured to display P points-viewpoint, for example 10 points-of-view (where P is equal to 10).

When the invention uses a single sub-pixel per point-of-view per lens and per horizontal line, each lens of the lenticular array covers P sub-pixels on each horizontal line. When the invention uses a single sub-pixel per point-of-view per lens on L horizontal lines, each lens of the lenticular array covers on each horizontal line P/L sub-pixels.

A screen according to the invention makes it possible to obtain an almost perfect resolving power, thanks to the creation of buffer zones formed by duplicating the image points-of-view and isolating the two points-of-view perceived from each other. by each of the two eyes. The I image points-of-view form I-1 successive stereoscopic pairs two by two and these different points-of-view are separated from each other by buffer zones created by duplicating an image point-of-view. In other words, each of the I screen points-of-view visible to the observer at the flat tint distance and each displaying an image point-of-view is flanked by at least 2 buffer points-of-view displaying each this same image point-of-view.

In addition, each lobe covering I times the average inter-pupillary distance of an observer, each of the I image points-of-view benefits from a space corresponding to an inter-pupillary distance to display the point-of-view there. perceived and its buffer points-of-view.

The invention thus goes against the prejudice of those skilled in the art who generally consider that the improvement of an autostereoscopic system should be done by increasing the number of image points-of-view, to increase the width of the lobe, the parallax and the viewing distance forward and backward of the flat tint distance, so as to give the viewer greater freedom of positioning. This can come at the expense of perceived resolution if the screen resolution is not increased proportionately.

The invention does not seek to give the spectator a greater latitude of positioning but to release the volume that they perceive. It rather tends for this to fix its position, so as to limit as much as possible the number of image points-of-view necessary, only two being able to suffice, in such a way as to obtain an almost perfect resolving power and to make possible the perception of unusually deep volumes.

The invention makes it possible to create a monocular sub-lobe per image point-of-view, equal in width to the reference inter-pupillary distance (approximately 6.5 cm), and to produce in this monocular sub-lobe the means of display the same image multiple times, such that each instance of that image is visible over a width equal to the monocular sub-lobe divided by the number of times the image is duplicated.

In the absence of the invention and when the contents are pushed far in front of or behind the plane of the screen, the disparity is very significant and the problem of ghosts particularly acute. The image seen by each eye is likely to retain a remanence of the image intended for the other eye. Since then, the left eye sees not only the left image intended for it, but also the ghost of the right image and vice versa, the right eye sees not only the right image intended for it, but also the ghost of the left image. Now the phantom of the right image seen in the left image matches stereoscopically with the right image itself, while the phantom of the left image seen in the right image matches stereoscopically with the image left itself, which positions the ghosts on the very plane of the screen, and not at the outlines of the elements in depth.

With the invention, the points-of-view close to those observed by the eyes of the observer come from the same image, which makes the crosstalk between them imperceptible.

Insofar as the images dedicated to the eyes of the observer are each replicated several times (at least 2 replicas to form at least 3 identical successive points-of-view, counting the point-of-view observed by the eye of the observer), each sub-pixel magnified by a lens for one eye is surrounded by sub-pixels which belong to the same image. Thus framed by its peers, a sub-pixel can no longer interfere with the one intended for the other eye. If it interferes with its immediate neighbors, it cannot be seen.

A display screen according to the invention therefore has the particularity of allowing the display of T buffer points-of-view between the points-of-view dedicated respectively to the left eye and to the right eye of the observer.

A screen according to the invention not only makes it possible to benefit from an almost perfect resolving power, but also to present the advantages of traditional multi-point-of-view content, namely:
- the possibility of moving away from the flat tint distance thanks to the recombination of points-of-view;
- the proportional increase of the lobe and therefore of the space in which the spectator can place their eyes;
- the parallax effect obtained when moving horizontally along the screen;
- the guarantee that any remaining ghosts, in the event of very strong contrasts and extreme disparities for example, are perceived at the edge of the objects and not on the plane of collimation of the images. This is an undeniable asset for applications that require the implementation of renderings conducive to the perception of ghosts.

Preferably, the optical array of a screen according to the invention is formed of cylindrical lenses which each have a main axis which forms an angle (E± with the direction of the columns.

Various inclinations of the optical array (between the vertical array and the array at 45¬∞) can be used provided that a suitable point-of-view distribution grid is defined. It is for example possible to use an array whose lenses are inclined at an angle (E± of 9.46¬∞, 18.43¬∞, 26.56¬∞ or 33.69¬∞, as shown in the figures discussed later.

According to a particularly advantageous variant of the invention, I is equal to 2 and the optical array is configured to be able to display in each lobe, M times the image point-of-view dedicated to the left eye of the observer and N times the image point-of-view dedicated to the right eye of the observer, M and N each being greater than or equal to 3 and their sum being equal to P, and by forming T buffer points-of-view between the point-of-view dedicated to the left eye and the point-of-view dedicated to the right eye.

This advantageous variant relates to a screen intended to display an autostereoscopic image with 2 points-of-view intended respectively for the right eye and the left eye of the observer.

In this preferential case of displaying an autostereoscopic image at 2 points-of-view (I=2), the screen is controlled to display only two different images intended respectively for the left eye and the right of observer. In other words, each image is repeated several times for each eye, in this case M times for the left eye and N times for the right eye, M and N each being an integer greater than or equal to 3 and their sum being equal to P.

Furthermore, the optical parameters of the optical component are chosen so that the P points-of-view (M points-of-view for the left eye and N points-of-view for the right eye) cover a lobe which is extends over a distance equal to twice the average inter-pupillary distance of an observer, that is to say in practice a distance of the order of 13 cm (the average inter-pupillary distance of an observer adult being 6.5 cm).

Thus, and in the case where P is equal to 10 and I is equal to 2, a screen point-of-view change occurs, at the flat tint distance, every 1.3 cm.

The display screen according to this variant can be designed such that the number of screen points-of-view intended to display the image point-of-view dedicated to the left eye of an observer located at the distance of flat tint is equal to or different from the number of screen points-of-view intended to display the image point-of-view dedicated to the observer's right eye. In other words, the screen can be designed in such a way as to obtain a symmetrical (M and N are then equal) or asymmetrical (M and N are then different from each other) arrangement of points-of-view dedicated to each of the two eyes of the observer.

Preferably, M and N are equal and the screen allows a symmetrical display of the points-of-view dedicated respectively to the left eye and to the right eye of the observer.

However, it is also possible to exploit an asymmetrical arrangement and minimize its disadvantages, taking into account the direction of movement of the observer's head to position the greatest number of buffer points-of-view in the zone of the lobe towards which the eyes are directed, and by dynamically optimizing the allocation of points-of-view in a predictive manner, by operating permutations in parts of the lobe not perceived by the eyes of the observer. This requires the use of a device for detecting the position of the observer's head, as discussed later in connection with the device according to the invention.

Preferably and according to this variant, the screen is also designed so that the sum of the number of points-of-view to the left of the left eye and the number of points-of-view to the right of the right eye is equal to the number of buffer points-of-view T separating those perceived by the two eyes of the observer.

This makes it possible to have the same number of successive buffer points-of-view T on each side of the two eyes.

According to a particular embodiment of the variant of the invention with 2 image points-of-view (I equal to 2), P is equal to 10 so that the screen has 10 screen points-of-view and the array optic is configured so that the pairs visible to the observer at the flat tint distance are views 1-6, 2-7, 3-8, 4-9 and 5-10 for successively numbered screen points-of-view from 1 to 10 so that each sub-pixel perceived by each eye of the observer can be surrounded on each side by 2 buffer points-of-view.

Thus and in the case where P is equal to 10 and M and N are each equal to 5, the points-of-view perceived by each eye are always separated by 4 other points-of-view, which act as a buffer and avoid interference.

Thus, when the right eye perceives point-of-view No. 3, the left eye perceives point-of-view No. 8. This point-of-view No. 3 is framed on its left by points-of-view No. 1 and No. 2 and on its right by points-of-view No. 4 and No. 5n while point-of-view No. 8 is framed on its left by points-of-view No. 6 and No. 7 and on its right by points-of-view No. 9 and No. 10. In this case, the 2 points-of-view perceived by the observer are isolated from each other by 4 buffer points-of-view, which makes it possible to avoid interference. The resolving power is therefore optimal for the screen according to this preferred embodiment of the invention.

According to a particular embodiment of the variant of the invention with 2 image points-of-view (I equal to 2), M and N are odd such that each image point-of-view dedicated to each eye of the observer can be surrounded, in each lobe, by the same number of buffer points-of-view.

For example, and if M and N are each equal to 5 (forming a screen with 10 points-of-view), the coding of the content of the autostereoscopic image is based on the encapsulation of a stereoscopic pair in a 10-points-of-view image format. Each sub-pixel perceived by an eye is framed by four buffer sub-pixels, 2 on its left and 2 on its right, which display the same image. The interferences of the neighboring sub-pixels with the perceived point-of-view are invisible since all display the same image.

The image is decoded by means of a lenticular array whose innovative architecture, with 10 points-of-view, makes it possible to change point-of-view every 1.3 cm. The average inter-pupillary distance being 6.5 cm, it makes it possible to insert 4 buffer points-of-view between the left point-of-view and the right point-of-view, as required by the content. The lobe of this array is 13 cm at the flat shade distance (twice the inter-pupillary distance). This also makes it possible to satisfy the pupillary distances different from the mean value of 6.5 cm chosen, with in this case the consequence of a modification of the ideal symmetry.

The invention can be implemented from different pixel arrays. For example, it is possible to use a pixel tile with horizontal sub-pixels (i.e. vertically overlapping sub-pixels) or a pixel tile with vertical sub-pixels (i.e. say of horizontally juxtaposed sub-pixels), or even a panel with organic light-emitting diodes (better known by the acronym OLED) or an active matrix with organic light-emitting diodes (better known by the AMOLED.

In the particular case of a panel formed of horizontal sub-pixels, each pixel of the matrix of pixels is composed of a plurality of sub-pixels of different colors superimposed on each other in the direction of the columns.

For a 2D display, the orientation in vertical or horizontal bands of the sub-pixels has no effect for the user, who does not perceive any difference in the display depending on the orientation of the screen. Information is always encoded at the pixel level and the arrangement of its substructure has no impact on the quality of the display.

On the other hand, for a 3D display, when a lenticular array acting by magnifying effect is glued to the surface of the screen, the orientation of the sub-pixels and the regularity of their geometry becomes decisive.

When using in landscape mode a screen whose sub-pixels are vertically aligned in portrait mode or when using pixel tiles whose pixel structure is anisotropic, the cylindrical microlenses of the lenticular array can no longer discriminate colors separately and must align whole pixels. An entire pixel then becomes the smallest entity that the lenses can allow to be observed individually by the magnifying effect.

The invention also relates to a device for displaying an autostereoscopic image at I points-of-view, called image point-of-view, including:
- a display screen according to the invention,
- a display module configured to display for each lobe, each of the I image points-of-view, each repeated P/I times, each point-of-view visible to the observer at the flat tint distance being framed by at least 2 buffer points-of-view each displaying this same image viewpoint.

The technical advantages and effects of a display screen according to the invention apply mutatis mutandis to a display device according to the invention.

According to the invention, the display module is configured to assign to each sub-pixel of the pixel matrix of the display screen, a sub-pixel of one of the I images intended for the eyes of the observer. This display module is preferably formed by a computer device for controlling the matrix of pixels.

Throughout the text, the term "module" denotes a software component, i.e. a subset of a software program, which can be compiled separately, either for independent use or to be assembled with other modules of a program, or a hardware component, or a combination of a hardware component and a software subprogram.

Preferably, the display module of a device according to the invention is a subset of a software program intended to be executed by a computer or by a microprocessor connected to the display screen.

According to a particularly advantageous variant, I is equal to 2 and the display module is configured to display in each lobe formed by the display screen, M times the image point-of-view dedicated to the left eye of the observer and N times the image point-of-view dedicated to the observer's right eye and by forming T buffer points-of-view, between the image point-of-view dedicated to the left eye and the image point-of-view dedicated to the right eye.

In the preferential case where I is equal to 2, these 2 points-of-view are intended respectively for the left and right eye of an observer. If I is greater than 2, the central I-2 points-of-view can be seen either by the left eye or by the right eye of an observer, depending on their position.

Advantageously and according to the invention, the device further includes a device for detecting, at any time, the position of the observer's head with respect to the horizontal and/or vertical direction so as to allow the display module to drag the image points-of-view in each lobe in such a way that the screen points-of-view visible to the observer are permanently framed by buffer points-of-view of the image point-of-view visible by this eye.

A display device according to this variant makes it possible to keep the observer permanently in the center of the lobe so that they perceive (if I=2 and N=M=5 to form 10 screen points-of-view, P=10) the points-of-view No. 3 and No. 8. A lobe of twice the inter-pupillary distance (that is to say of the order of 13 cm) offers a limited latitude of movement. Rather than forcing the observer to place himself in the center of the lobe, the invention makes it possible to dynamically calibrate the lobe to center it on the position of the observer, thanks to a device which tracks the observer's head.

The invention therefore makes it possible to identify the position of the observer's head with respect to the horizontal and/or vertical direction of the screen (that is to say to detect the lateral displacements of the head of the observer relative to the screen in the case of horizontal detection) and to drag the points-of-view in the lobe so as to present the points-of-view No. 3 and No. 8 to the observer. Insofar as the aim is, in this embodiment, only to identify the position of the observer's face with respect to the horizontal and/or vertical direction, a simple 2D camera is sufficient to ensure the tracking of the observer's head.

According to a variant embodiment of the invention, the detection device is configured to detect, at each instant, the position of the head of the observer—in particular of each eye of the observer—with respect to a predetermined point of the display screen, making it possible to define the coordinates X, Y, Z of each eye of the observer with a predetermined precision, in an orthonormal frame of reference whose the predetermined point of the screen is the origin of the frame, the screen defining the X and Y axes of this frame and the direction perpendicular to the screen defining the Z axis of this frame.

According to this variant of the invention, the position of the observer's head is determined at each instant in three dimensions, which makes it possible to use a device according to this variant in augmented reality applications.

In particular, when the brightness of the screen allows it, it is possible to use the screen, not in direct vision, but in reflection on a semi-reflecting mirror, so as to create an augmented reality experience of the "Pepper's ghost".

The 3D volume displayed on the screen then materializes in the room and offers the possibility of creating new immersive experiences, as long as we take care not to create conflicts in relief. In particular, care must be taken that a deep virtual object does not overlap with an element of the scene located in front of it.

The vergence/accommodation dissociation then no longer poses a problem because the gaze relies on the physical world to converge on the virtual elements that are inscribed there.

When the observer is not too close to the screen, the diopter difference is small enough for the feeling of sharpness to be good and visual fatigue to be minimal.

To be credible, an augmented reality experience must however offer a perfect balance between the physical world and the virtual world. Beyond the relief conflicts that must absolutely be avoided, the virtual objects which are superimposed on the real world must obey the same rules of perspective and react to the movements of the observer in the same way as the objects in the room. A virtual cube superimposed on a material cube must behave in all respects like the real object when the observer moves their head. The parallax between virtual objects perceived by the observer must also remain consistent with the position of their eyes. For this, it is essential to measure in real time, with low latency and very accurately, the position of each pupil of the observer in three dimensions.

The Z measurement is particularly important in this context. Indeed, given the good resolving power of the screen according to the invention and the great depths that it makes it possible to simulate, the disparity displayed produces a very different sensation of volume depending on the distance at which the content is collimated, but also depending on the viewer's distance from the screen. To generate images faithful to the physical world, the real-time image rendering engine must therefore know precisely the position in Z of the observer's pupils, in order to adapt the stereoscopic base and the focal length accordingly, and that in X and Y to adjust the parallax.

The invention therefore makes it possible to know the relative position of the observer with respect to the environment in order to adapt the virtual scene accordingly. In particular, the invention according to this variant makes it possible to know the distance at which the pupils of the observer are from the screen, to adapt the rendering of the virtual scene and make it consistent with the physical world.

Such a device can for example be used in a flight simulator, driving construction machinery, tele-operation, or any other simulator aimed at putting the user in hyperrealistic conditions, without requiring the wearing of an augmented reality headset.

In this particular application context, the room may be empty of objects and it is no longer essential to preserve consistency between the physical world and the virtual world. The measurement of the position in Z of the pupils nevertheless remains essential to adapt the stereoscopic base and the focal length, just as it is essential in X and Y to adapt the parallax.

The invention also relates to a method for displaying an autostereoscopic image at I points-of-view, I being an integer greater than or equal to 2, on a display screen at P points-of-view, called points-of screen view, P being an integer greater than or equal to 6 and greater than or equal to 3I, including a matrix of pixels arranged by rows and by columns, each pixel being composed of a plurality of sub-pixels of different colors, intended in each displaying a sub-pixel from one of the image points-of-view, and an array of cylindrical lenticules or a parallax barrier, called an optical array, configured to allow the projection of pairs of points-of-view of the predetermined screen towards the eyes of an observer located at a nominal distance from the screen, called the flat tint distance, and so that the P points-of-view of the screen can be perceived successively in one direction, called the horizontal direction, by the observer at the flat tint distance, in spaces in front of the screen year, called lobes, each covering I times the average inter-pupillary distance of an observer.

The method according to the invention is characterized in that it includes, for each lobe, the assignment to each adjacent screen point-of-view of each image point-of-view visible to the observer at the flat tint distance, of a copy of this image point-of-view such that, in each lobe, each of the I image points-of-view visible to the observer at the flat tint distance is framed by at least 2 buffer points-of-view displaying this same image viewpoint, and in that it consists of the succession of I image points-of-view each repeated P/I times.

The technical advantages and effects of a display screen according to the invention apply mutatis mutandis to a display method according to the invention.

According to a particularly advantageous variant of the invention, I is equal to 2 and the method includes, for each lobe:

the assignment to the first M screen points-of-view of the image point-of-view dedicated to the left eye of the observer, the assignment to the following N screen points-of-view of the image point-of-view dedicated to the right eye of the observer, M and N each being greater than or equal to 3 and their sum being equal to P.

The invention also relates to a display method and a display system characterized in combination by some or all of the characteristics mentioned above or below.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a schematic view of an aircraft according to one embodiment of the invention, FIG. 2 is a schematic view of a display screen according to one embodiment of the invention with 10 screen points-of-view of an image at 2 points-of-view including a tile of pixels formed of sub-vertical pixels surmounted by an optical array having an inclination of 18.43° with respect to the vertical (in other words, I=2; P=10; N=5; M=5; α=18.43°), FIG. 3 is a schematic view of the principle of arrangement of the left and right images on a screen according to one embodiment of the invention, FIG. 4 is a schematic view of a display screen according to one embodiment of the invention with 9 screen points-of-view of an image with 2 points-of-view including a tile of pixels formed of sub-vertical pixels surmounted by an optical array presenting an inclination of 18.43° with respect to the vertical (in other words, I=2; P=9; N=5; M=4; α=18.43°), FIG. 5 is a schematic view of a display screen according to one embodiment of the invention with 8 screen points-of-view screen of an image with 2 points-of-view including a pixel tile formed of sub-vertical pixels and surmounted by an optical array having an inclination of 18.43° with respect to the vertical (in other words, I=2; P=8; N=4; M=4; α=18.43°), FIG. 6 is a schematic view of a display screen according to one embodiment of the invention with 10 screen points-of-view of an image with 2 points-of-view including a tile of pixels formed of sub-vertical pixels and surmounted by an optical array having an inclination of 9.46° with respect to the vertical (in other words, I=2; P=10; N=5; M=5; α=9.46°), FIG. 7 is a schematic view of a display screen according to one embodiment of the invention with 10 screen points-of-view of an image with 2 points-of-view including a tile of pixels formed of sub-vertical pixels surmounted by an optical array having an inclination of 26.56° with respect to the vertical (in other words, I=2; P=10; N=5; M=5; α=26.56°), FIG. 8 is a schematic view of a display screen according to one embodiment of the invention with 10 screen points-of-view of an image with 2 points-of-view including a tile of pixels formed of sub-vertical pixels and surmounted by an optical array having an inclination of 33.69° with respect to the vertical (in other words, I=2; P=10; N=5; M=5; α=33.69°), FIG. 9 is a schematic view of a display screen according to one embodiment of the invention with 10 screen points-of-view of an image with 2 points-of-view including a tile of pixels formed of sub-horizontal pixels and surmounted by an optical array having an inclination of 18.43° with respect to the vertical (in other words, I=2; P=10; N=5; M=5; α32 18.43°), FIG. 10 is a schematic view of a display screen according to one embodiment of the invention with 6 screen points-of-view of an image with 2 points-of-view including a tile of pixels formed of sub-horizontal pixels and surmounted by an optical array having an inclination of 26.56° with respect to the vertical (in other words, I=2; P=6; N=3; M=3; α=26.56°), FIG. 11 is a schematic view of a display screen according to one embodiment of the invention with 10 screen points-of-view of an image with 2 points-of-view including a tile of pixels formed of sub-horizontal pixels and surmounted by an optical array presenting an inclination of 33.69° with respect to the vertical (in other words, I=2; P=10; N=5; M=5; α=33.69°), FIG. 12 is a schematic view of a display screen according to one embodiment of the invention with 20 screen points-of-view of an image with 4 points-of-view including a tile of pixels formed of sub-horizontal pixels and surmounted by an optical array with an inclination of 9.46° relative to the vertical (in other words, I=4; P=20; α=9.46°), FIG. 13 is a schematic view of a display screen according to one embodiment of the invention with 20 screen points-of-view of an image with 4 points-of-view including a tile of pixels formed of sub-horizontal pixels and surmounted by an optical array with an inclination of 18.43° relative to the vertical (in other words, I=4; P=20; α=18.43°), FIG. 14 is a schematic view of a display device according to one embodiment of the invention including a screen according to the invention, a tracking device and a display module.

DETAILED DESCRIPTION OF THE INVENTION

For the sake of illustration and clarity, the drawings do not strictly adhere to scales and proportions.

FIG. 1 is a partial schematic view of an autostereoscopic display screen according to the invention including a matrix 10 of pixels (also designated by the term pixel tile) arranged in rows and columns surmounted by an optical array 11 cylindrical lenticules. The optical array 11 is partially shown, but it is obvious that it extends in practice over the entire pixel panel, or where appropriate over the part of the screen dedicated to autostereoscopy.

The particularity of the screen according to the invention is that the optical array 11 is configured to allow the display of P points-of-view and that the solid angle in which these P points-of-view spread is I times the inter-pupillary distance, where I represents the number of points-of-view of the autostereoscopic image to be displayed by this screen.

For example, for a screen with 10 points-of-view (P=10) displaying an image at 2 points-of-view (I=2), the solid angle in which these 10 points-of-view are spread is 13 cm, i.e. twice the average inter-pupillary distance of 6.5 cm at the screen's flat tint distance.

In other words, the specific screen proposed by the inventors is equipped with an optical array 11 intended for the display of P points-of-view. The innovation consists in displaying on this screen only I different images, each replicated a certain number of times. On either side of each sub-pixel magnified by an eye lens are a number of sub-pixels belonging to the same image. Thus framed by its peers, a sub-pixel can no longer interfere with the one intended for the other eye. If it interferes with its immediate neighbors, it cannot be seen.

In the specific case of a screen with 10 points-of-view intended to display an autostereoscopic image at 2 points-of-view, the manufacture of an optical array with 10 points-of-view, visible successively in a lobe of 13 cm, requires a focal length of the microlenses 5 times longer than that necessary for a lobe of 65 cm (65 cm/13 cm=5) as already proposed by the applicant. Long focal length lenses have a proportionally larger radius of curvature and are easier to machine.

The machining of a long focal length optical component makes it possible to obtain an almost perfect surface condition after machining and bonding the front face with an optical silicone. Also, the imperfections inherent in screens of the prior art are greatly reduced with a screen according to the invention.

The person skilled in the art will be able to determine, depending on the target flat tint distance and the characteristics of the screen, the parameters of the optical array necessary to allow the display of the P points-of-view in lobes of I×6.5 cm.

For example, for a 15.6 inch 4K panel, whose display area measures approximately 345 mm×194 mm and each pixel 0.09 mm, the array pitch would be approximately 0.299 mm, the focal length of the lenticular array would depend on the usage conditions and could be 4 mm for a flat tint of 1.30 m (case of 10 points-of-view to display an image at 2 points-of-view)

6.1. Embodiment I=2; P=10; N=5; M=5; α=18.43°; Vertical Sub-Pixels

FIG. 2 illustrates an embodiment of the invention representing a 10-point-of-view screen for displaying a 2-point-of-view autostereoscopic image. The pixel tile is made up of vertical sub-pixels and the optical array has an inclination of 18.43° with respect to the vertical (in other words, I=2; P=10; N=5; M=5; α=18.43°).

This screen is intended to display in each lobe, 5 times the image point-of-view dedicated to the left eye of the observer and 5 times the image point-of-view dedicated to the right eye of the observer. In this figure and all those referring to a 2-point-of-view autostereoscopic image, the sub-pixels assigned to the right eye are represented in gray and the sub-pixels assigned to the left eye are represented in white.

In addition, a black frame materializes the smallest "modulo", that is to say the smallest block of necessary and sufficient data, which makes it possible to fill the entire screen by periodic repetition, with or without vertical and/or horizontal phase shift. The "modulo" most often fits under a single lens, but this is not always the case, depending on the angle of the array and the number of points-of-view.

Each pixel of the pixel tile is composed of sub-pixels of different colors, identified in the figures by means of the letters R, G and B (for red, green and blue). Each sub-pixel displays a sub-pixel from the left image perspective (white sub-pixel) or from the right image perspective (gray sub-pixel).

Each pixel is made up of an RGB triplet, represented schematically in FIG. 3 by different levels of gray as well as by the letters R, G and B. In FIG. 3, the sub-pixels dedicated to the left eye are surmounted by the letter G and the sub-pixels dedicated to the right eye are surmounted by the letter D.

The angle of the optical array being 18.43° in this embodiment, its tangent being 1/3 and the pixels being square, with each new line of pixels on the screen, the optical axis of the lenses shifts by one third of a pixel. At 10 points-of-view the pitch of the array is approximately 10/3 pixels.

Points-of-view 1 to 5 are dedicated to the right image and points-of-view 6 to 10 to the left image. Thanks to this particular arrangement, points-of-view 3 and 8 each have 2 buffer points-of-view on either side, which display the same image and with which there is no visible alteration of the perceived image.

Preferably, the screen is used with a device for tracking the head of the user making it possible to ensure that points-of-view 3 and 8 are the points-of-view addressed to the observer.

Thus, the points-of-view perceived by each eye (schematized by circles in FIG. 3 and by a transparency of the lens in FIG. 2) are separated by 4 other points-of-view, which serve as a buffer for a inter-pupillary distance of 6.5 cm, or by 3 or 5 other points-of-view when the inter-pupillary distance is lower or higher.

6.2. Embodiment I=2; P=9; N=5; M=5; α=18.43°); Vertical Sub-Pixels

FIG. 4 illustrates another embodiment of the invention representing a screen with 9 points-of-view for the display of an autostereoscopic image at 2 points-of-view. The pixel tile is made up of vertical sub-pixels and the optical array has an inclination of 18.43° with respect to the vertical (in other words, I=2; P=9; N=5; M=4; α=18.43°).

In this embodiment, the distribution of points-of-view is not balanced insofar as an odd number of screen points-of-view is available. In the example represented, we have chosen to assign 5 points-of-view to the left eye (represented by white sub-pixels in FIG. 4) and 4 points-of-view to the right eye (represented by gray sub-pixels in FIG. 4). Of course, another distribution of points-of-view could have been chosen for a substantially identical result. Depending on the direction of movement of the user, this distribution can be rebalanced. We favor the eye that moves towards the center of the lobe to give it more points-of-view between the two eyes.

In this embodiment, points-of-view 1 to 5 are dedicated to the right image and points-of-view 6 to 9 to the left image. Points-of-view 3 and 7 are the screen points-of-view projected towards the two eyes of the observer and the latter have 3 buffer points-of-view between them.

6.3. Embodiment I=2; P=8; N=5; M=5; α=18.43°); Vertical Sub-Pixels

FIG. 5 illustrates another embodiment of the invention representing an 8-point-of-view screen for displaying an autostereoscopic image at 2 points-of-view. The pixel tile is made up of vertical sub-pixels and the optical array has an inclination of 18.43° with respect to the vertical (in other words, I=2; P=8; N=4; M=4; α=18.43°).

In this embodiment, points-of-view 1 to 4 are dedicated to the right image (represented in gray) and points-of-view 5 to 8 to the left image (represented in white). Points-of-view 3 and 7 are the screen points-of-view projected towards the two eyes of the observer and the latter have 3 buffer points-of-view between them.

Of course, other configurations are possible than those shown, both in terms of number of screen points-of-view and inclination of the lenticular array.

6.4. Embodiment I=2; P=10; N=5; M=5; α=9.46°; Vertical Sub-Pixels

FIG. 6 illustrates another embodiment of the invention representing a screen with 10 points-of-view for displaying thereon an autostereoscopic image at 2 points-of-view. The pixel tile is made up of vertical sub-pixels and the optical array has an inclination of 9.46° with respect to the vertical (in other words, I=2; P=10; N=5; M=5; α=9.46°).

It differs from the embodiment in FIG. 2 due to the angle of the optical array, which implies a grid of filling of the points-of-view adapted to this specific arrangement, but also by a pitch of the lenses twice as fine. The points-of-view are in phase opposition, which has the effect of spreading the "modulo" over 6 lines instead of 2.

6.5. Embodiment I=2; P=10; N=5; M=5; α=26.56°); Vertical Sub-Pixels

FIG. 7 illustrates another embodiment of the invention representing a screen with 10 points-of-view for the display of an autostereoscopic image at 2 points-of-view. The pixel tile is made up of vertical sub-pixels and the optical array has an inclination of 26.56° from the vertical (in other words, I=2; P=10; N=5; M=5; α=26.56°).

It differs from the embodiment in FIG. 2 due to the angle of the optical array, which involves a viewpoint fill grid adapted to this specific arrangement, but the pitch of the lenses is the same. On the other hand, the "modulo" spreads out here under three lenses instead of just one. FIG. 7 therefore represents these three lenses.

6.6. Embodiment I=2; P=10; N=5; M=5; α=33.69°; Vertical Sub-Pixels

FIG. 8 illustrates another embodiment of the invention representing a screen with 10 points-of-view for the display of an autostereoscopic image at 2 points-of-view. The pixel tile is made up of vertical sub-pixels and the optical array has an inclination of 33.69° from the vertical (in other words, I=2; P=10; N=5; M=5; α=33.69°).

Also, the only difference with respect to the embodiment in FIG. 4 is the angle of the optical array, which implies a point-of-view filling grid adapted to this specific arrangement.

6.7. Embodiment I=2; P=10; N=5; M=5; α=18.43°; Horizontal Sub-Pixels

The invention also applies to tiles of pixels formed of horizontal sub-pixels.

Thus, FIG. 9 illustrates an embodiment of the invention representing a screen with 10 points-of-view for displaying an autostereoscopic image at 2 points-of-view. The pixel tile is made up of horizontal sub-pixels and the optical array has an inclination of 18.43° with respect to the vertical (in other words, I=2; P=10; N=5; M=5; α=18.43°).

In this screen, each pixel of the pixel matrix is composed of a plurality of sub-pixels of different colors superimposed on each other in the direction of the columns and associated with an optical array formed of cylindrical lenses each having a main axis which forms an angle of 18.43° with the direction of the columns.

The cylindrical microlenses of the lenticular array can no longer discriminate colors separately and they simultaneously magnify the three RGB components of each pixel. The entire pixel then becomes the smallest entity that the lenses can individually observe by magnifying effect.

In addition, the three color dots making up each pixel are assembled to form a square, approximately. In other words and according to this variant, the color dots fit into three small juxtaposed and superimposed rectangles three times wider than high to form a square, the pixel.

It is clearly observed in FIG. 9 that the horizontal sub-pixels are grouped in blocks of three to each display the same point-of-view of the image dedicated either to the left eye (shown in white) or dedicated to the right eye (shown in grey).

As for the version with horizontal sub-pixels, points-of-view 1 to 5 are dedicated to the right image and points-of-view 6 to 10 to the left image.

6.8. Embodiment I=2; P=6; N=3; M=3; α=26.56°); Horizontal Sub-Pixels

FIG. 10 illustrates an embodiment of the invention representing a 6-point-of-view screen for displaying an autostereoscopic image at 2 points-of-view. The pixel tile is made up of horizontal sub-pixels and the optical array has an inclination of 26.56° with respect to the vertical (in other words, I=2; P=6; N=3; M=3; α=26.56°).

In this embodiment, each viewpoint addressed to each eye of the observer is framed by 2 buffer points-of-view on either side of this point-of-view.

6.9. Embodiment I=2; P=10; N=5; M=5; α=33.69°; Horizontal Sub-Pixels

FIG. 11 illustrates an embodiment of the invention representing a 10-viewpoint screen for displaying a 2-viewpoint autostereoscopic image. The pixel tile is made up of horizontal sub-pixels and the optical array has an inclination of 33.69° from the vertical (in other words, I=2; P=10; N=5; M=5; α=33.69°).

Also, the only difference with respect to the embodiment in FIG. 9 is the angle of the optical array, which implies a point-of-view filling grid adapted to this specific arrangement.

Of course, other configurations are possible than those shown, both in terms of number of screen points-of-view and inclination of the lenticular array.

Note that the embodiments of in FIGS. 9, 10 and 11 can also be applied to an IPS panel (acronym for "In-Plane Switching"), to an organic light-emitting diode panel (OLED) or to an active matrix with organic light-emitting diodes (AMOLED).

In fact, like a screen whose pixels are made up of a plurality of sub-pixels of different colors superimposed on each other in the direction of the columns, panels with anisotropic pixels can benefit from the invention tor obtain near-perfect resolving power, preventing the optical axis of the lenses from intersecting contiguous pixels and generating ghost images.

6.10. Embodiment I=4; P=20; α=9.46°; Vertical Sub-Pixels

FIG. 12 illustrates another embodiment of the invention representing a 20-point-of-view screen for displaying a 4-point-of-view autostereoscopic image. The pixel tile is formed of vertical sub-pixels and the optical array has an inclination of 9.46° with respect to the vertical (in other words, I=4; P=20; α=9.46°).

It differs essentially from the embodiment in FIG. 6 because of the number of image points-of-view which is here equal to 4 instead of 2, which implies a suitable grid for filling the points-of-view. The pitch of the lenses is in this case twice as large.

In this figure as well as in FIG. 13, the 4 image points-of-view are represented respectively by the white sub-pixels, the gray sub-pixels, the vertical hatched sub-pixels and the black sub-pixels.

In the embodiment in FIG. 12, the screen points-of-view 1 to 5 display the first image point-of-view (gray sub-pixels), the screen points-of-view 6 to 10 display the image point-of-view (hatched subpixels), screen points-of-view 11 to 15 display the third image point-of-view (black subpixels), and screen points-of-view 16 to 20 display the fourth image point-of-view (white sub-pixels).

The lens represented in the figure makes it possible to project towards the observer, according to their position, the stereoscopic pairs of points-of-view 3-8; 8-13 or 13-18, the points-of-view visible to the observer being separated from each other by 4 buffer points-of-view. Each points-of-view visible to the observer is well framed by at least 2 screen points-of-view that display the same image point-of-view.

The number of screen points-of-view makes it possible, despite the number of image points-of-view, to maintain 2 buffer points-of-view on either side of each point-of-view addressed to the eyes of the observer. In other words, each image point-of-view extends over 5 consecutive sub-pixels. As such, it can be considered that M=5 and N=5 for each of the image points-of-view.

6.11. Embodiment I=4; P=20; N=5; M=5; α=18.43°; Vertical Sub-Pixels

FIG. 13 illustrates another embodiment of the invention showing a 20-point-of-view screen for displaying a 4-point-of-view autostereoscopic image. The pixel tile is made up of vertical sub-pixels and the optical array has an inclination of 18.43° with respect to the vertical (in other words, I=4; P=20; N=5; M=5; α=18.43°).

It differs essentially from the embodiment in FIG. 2 due to the number of image points-of-view which is here equal to 4 instead of 2, which implies a suitable point-of-view filling grid. The pitch of the lenses is in this case twice as large.

FIG. 14 is a schematic view of a device for displaying an autostereoscopic image with 2 points-of-view according to one embodiment of the invention.

Such a device is formed of a display screen 12 according to the invention, of a display module 13 configured to display the right and left images according to the configuration described previously and of a detection device 14, at each moment, of the position of the head of the observer 8 with respect to the horizontal direction so as to allow the display module to drag the image points-of-view in each lobe in such a way that the points-of-view screen view visible to the observer are permanently framed by buffer points-of-view of the image point-of-view visible by this eye.

The tracking device 14 can be of any known type. It may for example be the device marketed under the reference Intel RealSense® SR300 (SDK1 Gold Release). It is a time-of-flight RGBD camera, accompanied by an optimized face tracking library.

According to one variant, the detection device is configured to detect, at each instant, the position of the observer's head with respect to a predetermined point of the display screen, making it possible to define the coordinates X, Y, Z of the observer with a predetermined precision, in an orthonormal frame of reference whose the predetermined point of the screen is the origin of the frame, the screen defining the X and Y axes of this frame and the direction perpendicular to the screen defining the Z axis of this coordinate system.

As indicated previously, this variant makes it possible in particular to use a screen according to the invention in an augmented reality application, for example for simulation or head-up display applications in automobiles. Indeed, augmented reality requires significant contrasts. The black elements are transparent while the white elements are the most material. If one wishes to display a white square on a transparent background, it is essential to remove all possible causes of ghost images, which would interfere with the perceived images.

However, a device according to the invention which combines a screen according to the invention and a face tracking device makes it possible to obtain an almost perfect resolving power and therefore applicable to augmented reality applications.

The invention is not limited solely to the embodiments described. In particular and as specified, various screens can be made to obtain an autostereoscopic device with almost perfect resolving power. The invention makes it possible to upset the experience of relief as we know it. The usual rules of relief scene composition are obsolete and all stereoscopic content can be displayed with unrivaled relief perception.

Although the vergence/accommodation dissociation persists, it becomes easier to get used to, in the absence of any optical noise in the stereoscopic couple, of degradation of brightness and colors and without the clutter of 3D glasses or a headset.

Thanks to its unequaled resolving power and to the exceptional amplitude of the relief which it makes it possible to exploit, the screens of the invention make it possible to respond to very many requests for uses which are little or not at all satisfied by the existing devices.

The invention opens up countless market prospects for individual autostereoscopic applications in a very large number of technical fields, including: medical imaging, surgical robotics, videoconferencing, automotive, education, slot machines, remote monitoring, remote operation, drone piloting, aeronautics, cartography, seismology and geological prospecting, mining and oil, scientific studies at all scales, from the microscope to satellites, simulation, relief film production line, CAD, design, mechanics, architecture, virtual tours, museums, games, telephony/tablets, entertainment, etc.

A particularly interesting application case of augmented reality concerns the particular application context where the background of the scene does not consist of a physical decor but of the display on a screen or by means of a projector of a 2D image, synchronized with the scene and representing the backgrounds.

The autostereoscopic screen according to the invention makes it possible to display an autostereoscopic image of very large amplitude, for example 20 meters deep, which occupies all the physical space separating the screen according to the invention from the background 2D image. Beyond about twenty meters, the eyes perceive little disparity and monocular cues, such as perspective, become preponderant. 2D backgrounds, if they incorporate strong visual cues like perspective, therefore perfectly complement the illusion and help increase the viewer's sense of immersion.

Such an installation is mainly single user (in particular when an autostereoscopic image with 2 points-of-view is used), but could nevertheless, because of the exceptional quality of filling of the two subparts of the lobe, be used by several users, positioned at the flat tint distance. Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. An autostereoscopic display screen with P points-of-view, called screen points-of-view, P being an integer greater than or equal to 6, intended to display an autostereoscopic image at I points-of-view, called image points-of-view, I being an integer greater than or equal to 2, less than or equal to P/3, preferably equal to 2, said screen comprising:
   a matrix of pixels arranged by rows and by columns, each pixel being composed of a plurality of sub-pixels of different colors, each intended to display a sub-pixel of one of the image points-of-view,
   an array of cylindrical lenticules or a parallax barrier, called an optical array, configured to allow the projection of pairs of predetermined points-of-view of the screen towards the eyes of an observer located at a nominal distance of 1 screen, called flat tint distance,
   said screen being characterized in that said optical array is configured so that the P points-of-view of the screen can be perceived successively in a direction, called horizontal direction, by said observer at said flat tint distance, in spaces in front of the screen, called lobes, each covering I times the average inter-pupillary distance of an observer, and so that the screen points-of-view of each pair of visible points-of-view by the observer at the flat tint distance, are separated by at least T points-of-view, called buffer points-of-view, T being greater than or equal to 2, so that it is possible to display successively for each lobe, each of the I image points-of-view, each repeated P/I times, and that each point-of-view visible to the observer at the flat tint distance can be surrounded by at least 2 buffer points-of-view each displaying this same image viewpoint.

2. The display screen according to claim 1, characterized in that I is equal to 2 and in that the said optical array is configured to be able to display in each lobe, M times the image point-of-view dedicated to the left eye of the observer and N times the image point-of-view dedicated to the right eye of the observer, M and N each being greater than or equal to 3 and their sum being equal to P, and by forming T buffer points-of-view between the point-of-view dedicated to the left eye and the point-of-view dedicated to the right eye.

3. The display screen according to claim 2, characterized in that M and N are odd such that each image point-of-view dedicated to each eye of the observer can be surrounded, in each lobe, by the same number of buffer points-of-view.

4. The display screen according to claim 2, characterized in that M and N are equal so that the screen allows a symmetrical display of the points-of-view dedicated respectively to the left eye and to the observer's right eye.

5. The display screen according to claim 2, characterized in that P is equal to 10 so that the screen has 10 points-of-view and in that the said optical array is configured so that the pairs visible to the observer at the flat tint distance are views 1-6, 2-7, 3-8, 4-9, 5-10 for points-of-view numbered successively from 1 to 10 so that each sub-pixel perceived by each eye of the observer can be surrounded on each side by 2 buffer points-of-view.

6. The display screen according to claim 1, characterized in that the said optical array is formed of cylindrical lenses each having a main axis which forms an angle α with the direction of the columns.

7. The display screen according to claim 6, characterized in that the said angle α is between 0° and 45°, and preferably chosen from the group comprising the angles of 9.46°; 18.43°; 26.56°; and 33.69°.

8. The display screen according to claim 1, characterized in that each pixel of the said matrix of pixels is composed of a plurality of horizontal sub-pixels of different colors superimposed on each other in the direction columns.

9. The display screen according to claim 1, characterized in that each pixel of the said matrix of pixels is composed of a plurality of vertical sub-pixels of different colors juxtaposed to each other in the direction lines.

10. A device for displaying an autostereoscopic image at I points-of-view, called image point-of-view, comprising:
   a display screen comprising:
      a matrix of pixels arranged by rows and by columns, each pixel being composed of a plurality of sub-pixels of different colors, each intended to display a sub-pixel of one of the image points-of-view,
      an array of cylindrical lenticules or a parallax barrier, called an optical array, configured to allow the projection of pairs of predetermined points-of-view of the screen towards the eyes of an observer located at a nominal distance of 1 screen, called flat tint distance,
      said screen being characterized in that said optical array is configured so that the P points-of-view of the screen can be perceived successively in a direction, called horizontal direction, by said observer at said flat tint distance, in spaces in front of the screen, called lobes, each covering I times the average inter-pupillary distance of an observer, and so that the screen points-of-view of each pair of visible points-of-view by the observer at the flat tint distance, are separated by at least T points-of-view, called buffer points-of-view, T being greater than or equal to 2, so that it is possible to display successively for each lobe, each of the I image points-of-view, each repeated P/I times, and that each point-of-view visible to the observer at the flat tint distance can be surrounded by at least 2 buffer points-of-view each displaying this same image viewpoint, and,
   a display module configured to display for each lobe each of the I image points-of-view, each repeated P/I times, each point-of-view visible to the observer at the flat tint distance being framed at least 2 buffer points-of-view each displaying this same image point-of-view.

11. The display device according to claim 10, characterized in that I is equal to 2 and in that said display module is configured to display in each lobe formed by said display screen, M times the image point-of-view dedicated to the left eye of the observer and N times the point-of-view image dedicated to the right eye of the observer and forming T points-of-view, called buffer points-of-view, between the image point-of-view dedicated to the left eye and the image point-of-view dedicated to the right eye.

12. The display device according to claim 11, characterized in that it further comprises a device for detecting, at any instant, the position of the observer's head with respect to the said horizontal and/or vertical direction so as to allow said display module to slide the image points-of-view in each lobe such that said screen points-of-view visible to the observer are permanently framed by buffer points-of-view from the image point-of-view visible by that eye.

13. The display device according to claim 12, characterized in that the said detection device is configured to detect, at each instant, the position of the observer's head with respect to a predetermined point of the display screen, making it possible to define the coordinates X, Y, Z of the observer with a predetermined precision, in an orthonormal frame of reference of which said predetermined point of the screen is the origin of said frame, said screen defining the axes X and Y of this frame and the direction perpendicular to the screen defining the Z axis of this frame.

14. A method for displaying an autostereoscopic image at I points-of-view, I being an integer greater than or equal to 2, on a display screen at P points-of-view, called screen points-of-view, P being an integer greater than or equal to 6 and greater than or equal to 3I, comprising a matrix of pixels arranged by rows and by columns, each pixel being composed of a plurality of sub-pixels of different colors, each intended to display a sub-pixel of one of the image points-of-view, and an array of cylindrical lenticules or a parallax barrier, said optical array, configured to allow the projection of pairs of points-of-view of the predetermined screen towards the eyes of an observer located at a nominal distance from the screen, called the flat tint distance, and so that the P points-of-view of the screen can be perceived successively in one direction, called the horizontal direction, by said observer at said flat tint distance, in spaces in front of the screen, said lobes, each covering each I times the average inter-pupillary distance of an observer, characterized in that it comprises, for each lobe, the allocation to each adjacent screen point-of-view of each image point-of-view visible by the observer at the flat tint distance, of a copy of this image point-of-view such that, in each lobe, each of the I image points-of-view visible to the observer at the tint distance plate is flanked by at least 2 buffer points-of-view each displaying this same image points-of-view, and in that it is made up of the succession of I image points-of-view each repeated P/I times.

15. The method according to claim 14, characterized in that I is equal to 2 and in that it comprises, for each lobe:
- the assignment to the first M screen points-of-view of the image point-of-view dedicated to the left eye of the observer,
- the assignment to the following N screen points-of-view of the image point-of-view dedicated to the right eye of the observer,
- M and N each being greater than or equal to 3 and their sum being equal to P.

* * * * *